United States Patent [19]

Duncan et al.

[11] Patent Number: 5,427,390
[45] Date of Patent: Jun. 27, 1995

[54] SKI ATTACHMENT FOR A WHEELED VEHICLE

[75] Inventors: D. Scott Duncan, Mississauga; Ross A. Lisson, Oakville, both of Canada

[73] Assignee: Stroll-Ski, Inc., Mississauga, Canada

[21] Appl. No.: 136,923

[22] Filed: Oct. 18, 1993

[51] Int. Cl.$^6$ .............................................. B62B 13/18
[52] U.S. Cl. ......................................... 280/8; 280/13; 280/47.38; 280/7.12
[58] Field of Search ...................... 280/7.12, 8, 10, 13, 280/47.38; 24/488; 211/20, 24; 248/113, 316.5, 501

[56] References Cited

U.S. PATENT DOCUMENTS

| | | | |
|---|---|---|---|
| 380,320 | 4/1888 | Gash | 248/113 |
| 594,752 | 11/1897 | Owen | 280/13 |
| 886,458 | 5/1908 | Wren | 248/113 |
| 1,472,880 | 11/1923 | Mahr | 280/13 |
| 1,581,420 | 4/1926 | Beeler | 280/13 |
| 2,081,024 | 3/1936 | Turner | 280/13 |
| 2,352,966 | 2/1942 | Morando | 280/8 |
| 2,530,240 | 11/1950 | Graham | 280/13 |
| 2,741,486 | 4/1956 | Torgrimson | 280/13 |
| 4,717,088 | 1/1988 | Fohl | 280/806 |

FOREIGN PATENT DOCUMENTS 45113  11/1910  Austria ................. 280/13

*Primary Examiner*—Brian L. Johnson
*Assistant Examiner*—Min Son Yu
*Attorney, Agent, or Firm*—Donald E. Hewson

[57] ABSTRACT

A ski attachment for operatively mounting onto one wheel of a wheeled vehicle, typically an unpowered wheeled vehicle such as a baby carriage or wagon, is disclosed. The wheel has an annular tire portion and a thinner centrally disposed hub portion. The ski attachment comprises a generally planar, elongated runner portion and upturned front and rear portions. A single attachment member has first and second co-operating arm members mounted on said base portion and extending upwardly from the ski member with first and second opposed gripping members mounted on the first and second arm members, respectively. The first and second gripping members are shaped and dimensioned so as to engage the hub portion of the wheel. A spring member is used to bias the first and second arm members into closing engagement so as to provide a gripping force therebetween. The gripping force is sufficient so as to cause the first and second opposed gripping members to grip the hub of the wheel and thereby keep the ski attachment operatively mounted on the wheel. The ski attachment is mounted on the wheel such that the single attachment member grips the wheel at the bottom thereof, at substantially the same location that the wheel rests on the ski attachment. The first and second arm members of the single attachment member are shaped and dimensioned so as to position the first and second opposed gripping members substantially in radial alignment on the wheel with the segment of the ski attachment that receives the annular tire portion of the wheel.

8 Claims, 2 Drawing Sheets

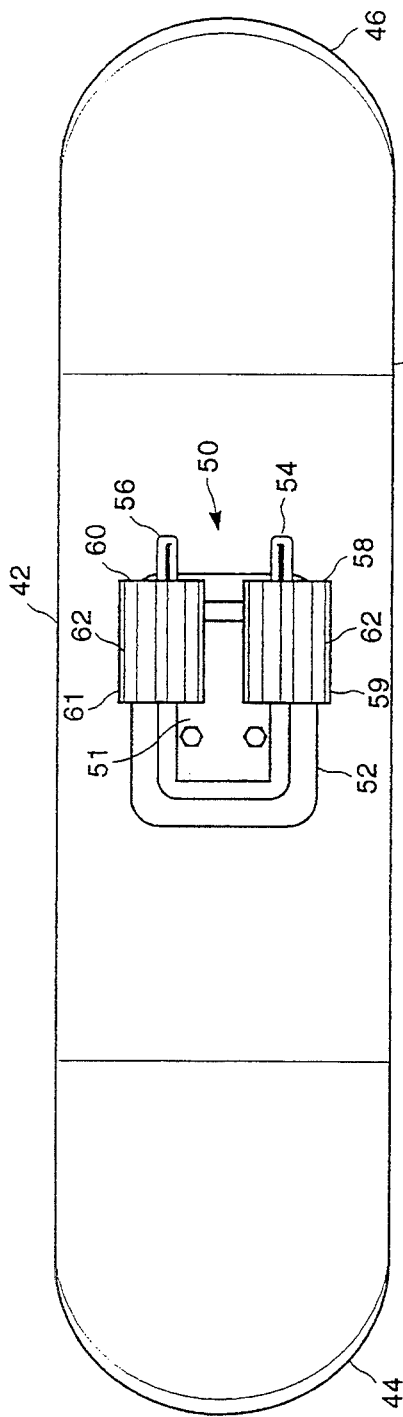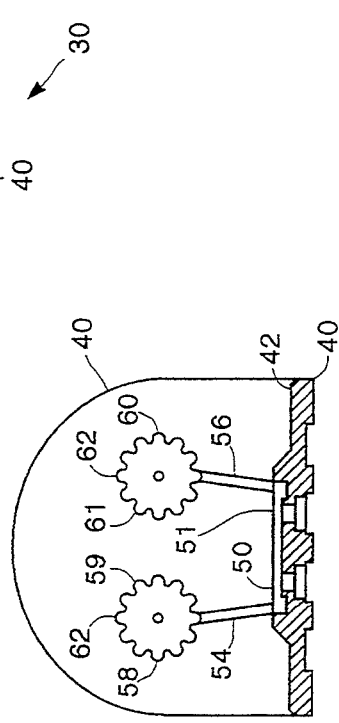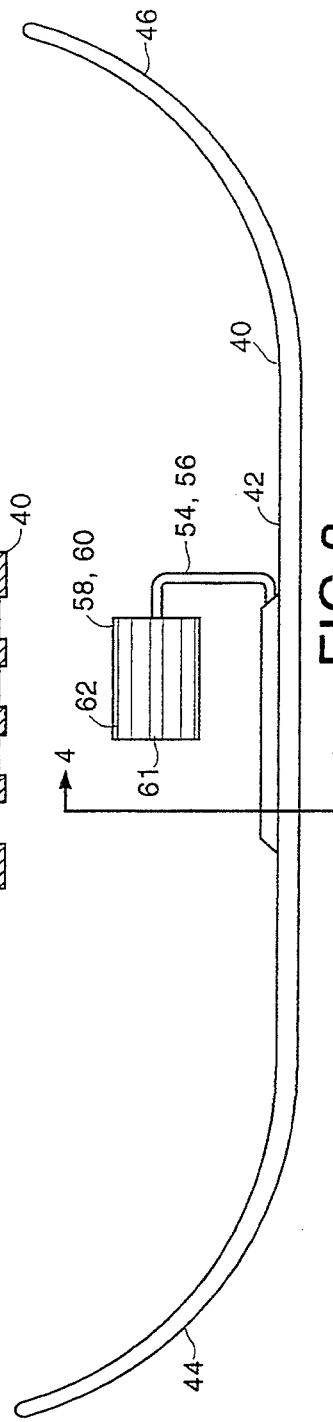

SKI ATTACHMENT FOR A WHEELED VEHICLE

FIELD OF THE INVENTION

This invention relates to skis and more particularly to readily attachable and detachable skis for use in conjunction with wheels on small unpowered wheeled vehicles.

1. BACKGROUND OF THE INVENTION

Small unpowered wheeled vehicles such as baby carriages, perambulators, strollers, wagons and the like are frequently used by people, such as young parents, to transport young children, and even infants, to a shopping mall, for instance. The baby carriage, perambulator, stroller, wagon or the like is then used in the shopping mall, and then used to transport the children, infants and also whatever may have been purchased at the shopping mall, back home again.

In winter months in more northerly climates, it can be difficult to push or generally manoeuvre a small unpowered wheeled vehicle such as a baby carriage, perambulator, stroller, wagon, or the like, over snow and ice. The wheels of such vehicles typically tend to sink in soft snow, slide over hard packed snow or ice, and tend to become lodged in ruts or other depressions, such as footprints, and can be very difficult to manoeuvre across such surfaces and the ride tends to become quite bumpy. It is generally very difficult, if not nearly impossible, for a vehicle having narrow wheels of a diameter of perhaps 4 to 30 inches, or perhaps a bit more, to be readily pushed through snow, or to be easily pushed over rough snowy and icy terrain. In any event, pushing or otherwise manoeuvring a baby carriage, perambulator, stroller, wagon or the like over snowy or icy terrain can by very difficult, even to a point where it is not worth the effort. Resultingly, many people who would otherwise use such a unpowered wheeled vehicle in favourable weather, or at least where terrain conditions permit, would not use it over snow and icy terrain.

In the event that a toboggan or sled is used to traverse over winter terrain to a destination such as a shopping mall, it is generally not possible to take the toboggan or sled into the shopping mall. It is necessary to carry whatever might have been on the toboggan or sled while in the shopping mall, and to leave the toboggan or sled outside, which is highly undesirable.

One alternative to using a toboggan or sled is to carry, by hand, whatever might have otherwise been carried on the toboggan or sled. This is generally quite undesirable, and may even not be possible to carry everything that might otherwise be carried in the baby carriage, perambulator, stroller, wagon or the like. Resultingly, it is common to use another mode of transportation such as perhaps an automobile, during the winter months. However, in many cases, this may be undesirable or perhaps not even possible.

It would be desirable, in many instances, to be able to take a wheeled vehicle such as a baby carriage, wagon or the like to a shopping mall during winter months if the wheeled vehicle could be readily adapted to traverse snowy and icy terrain, and could also readily be used in a normal manner in the shopping mall.

2. PRIOR ART

Various prior art devices relating to this field exist, with several prior art patents disclosing attachable and detachable skis for use on wheeled vehicles such as baby carriages, perambulators, strollers, wagons and the like.

U.S. Pat. No. 1,472,880 to MAHR, discloses a detachable sleigh runner for baby carriages, wherein a double-ended ski is adapted to fit around the two aligned wheels on either side of a baby carriage. This detachable sleigh runner is therefore more difficult to attach than is the ski attachment of the present invention. Further, the detachable sleigh runner is unnecessarily large, with the upturned positions also being unnecessarily large in order to help keep the sleigh runner mounted on the wheels. The MAHR patent also teaches a means to help retain the detachable sleigh runner on the two aligned wheels by the use of two metal clips per wheel. The bent sheet metal clips generally contact the tire portion—not the hub portion—of the wheel. Accordingly, one clip of the type disclosed in this patent could not be used to hold a ski attachment to a single wheel. Further, wheels of different diameters could not be accommodated by this sleigh runner.

U.S. Pat. No. 1,581,420 to BEELER, discloses a sled runner for coasters, wherein the runner is made of springy steel and attaches to a wheel at four locations, but only to the outer perimeter of the tire portion of the wheel. This sled runner is more complicated than the present invention, and is more difficult to attach.

U.S. Pat. No. 2,530,240 to GRAHAM discloses a sleigh runner attachment that clamps onto the wheels of a wagon by way of a plurality of clamps made of springy sheet steel. These clamps are significantly different than the clamps used in the present invention in that they clamp, again, to the tire portion of the wheel. There are either two or three clamps used to clamp the sleigh runner to one or two wheels.

U.S. Pat. No. 2,741,486 to TORGRIMSON discloses a sled runner attachment for wheeled vehicles. The sled runner attachment has a ski member and a heavy frame member extending upwardly from the ski member. A set of jaws grips a wheel, with the jaws being open and closed by operation of a lever handle, which opening and closing of the lever handle rocks a link member, thereby pulling on a spring biased mechanical arm arrangement that operates the jaws. This sled runner attachment is much more complicated than the present invention and is meant for use with larger wheels, such as those on an automobile. Austrian Patent 45113 to MARKQUART discloses a ski attachment that clamps to a spoked wheel by way of a pair of spring biased arm members. This ski attachment is clamped to the wheel at only one location. However, there are two separate and distinct spaced apart locations where the ski attachment physically contacts the wheel. One location is the clamp, and the second location is the base of the wheel, where the wheel rests on the ski.

What is not disclosed in the prior art is a ski attachment that contacts a wheel at one location only and clamps onto the wheel at one location only, with that contact location being in the same place where the wheel rests on the ski. The advantage of this manner of attaching a ski attachment to a wheel is that the ski attachment of the present invention may be operatively mounted on virtually any diameter wheel, given that the wheel is of appropriate width. The ski attachments as taught by the prior art cannot be attached to wheels of virtually any diameter. At best, any of them could be attached to wheels of a small range of diameters. The range of diameters of about 4 inches to about 30 inches could not possibly be accommodated by any of the prior art devices.

Another advantage of the present invention is that the ski member part of the ski attachment can move in a angular sense—or, in other words, can pivot—with respect to the wheel in order to help absorb the impact of bumps. Without the freedom for the ski attachment to pivot with respect to the wheel, angular rotation of the wheel is limited to a few degrees as determined by the orientation of the ski attachment on the snowy or icy terrain. The wheel, of course, does not rotate with a ski attachment mounted thereon. Correspondingly, the rotation of the wheel and ski attachment together around the wheel's pivot axis is of very little use in accommodating bumps. Also, the ski attachment is easy to attach to and detach from the wheel. Further, the ski attachment of the present invention does not clamp directly on to the wire portion of the wheel, thereby precluding the chance of damage to the tire portion.

SUMMARY OF THE INVENTION

There is provided by the present invention a ski attachment for operatively mounting onto one wheel of a wheeled vehicle, the wheel being configured to rotate about a central axis. Typically, the wheeled vehicle is an unpowered wheeled vehicle such as a baby carriage, perambulator, stroller, or wagon, wherein the wheel has an annular tire portion and a thinner centrally disposed hub portion. The ski attachment comprises a generally planar, generally elongated runner portion having upturned front and rear portions. A single attachment member is securely attached to the runner portion of the ski member. The single attachment member has first and second co-operation arm member extending upwardly from the ski member with first and second opposed gripping members mounted on the first and second arm members, respectively. The first and second gripping members are shaped and dimensioned so as to engage the hub portion of the wheel. A spring is used to bias the first and second arm members into closing engagement so as to provide a gripping force therebetween. The gripping force is sufficient so as to cause the first and second opposed gripping members to grip the hub of the wheel and thereby keep the ski attachment operatively mounted on the wheel. The first and second arm member of the single attachment member are shaped and dimensioned so as to position the first and second opposed gripping members substantially in radial alignment on the wheel with the segment of the ski attachment, preferably on the runner portion thereof, that receives the annular tire portion of the wheel. The ski attachment is thereby mounted to the wheel such that the single attachment grips the wheel at the bottom thereof, generally at the same location that the wheel rests on the ski attachment, so as to be interposed between the central axis of the wheel and the segment of the ski attachment that receives the annular tire portion of the wheel.

BRIEF DESCRIPTION OF THE DRAWINGS

Embodiments of the present invention will now be described in association with accompanying drawings, which are by way of example only, and in which:

FIG. 3 is a side elevational view of the ski attachment of FIG. 2;

FIG. 4 is a sectional and elevational view of the ski attachment of

FIG. 2, taken along section line 4—4 in FIG. 3; and

FIG. 5 is a top plan view of the ski attachment of FIG. 2.

DETAILED DESCRIPTION OF THE PREFERRED EMBODIMENTS

Figure 1:
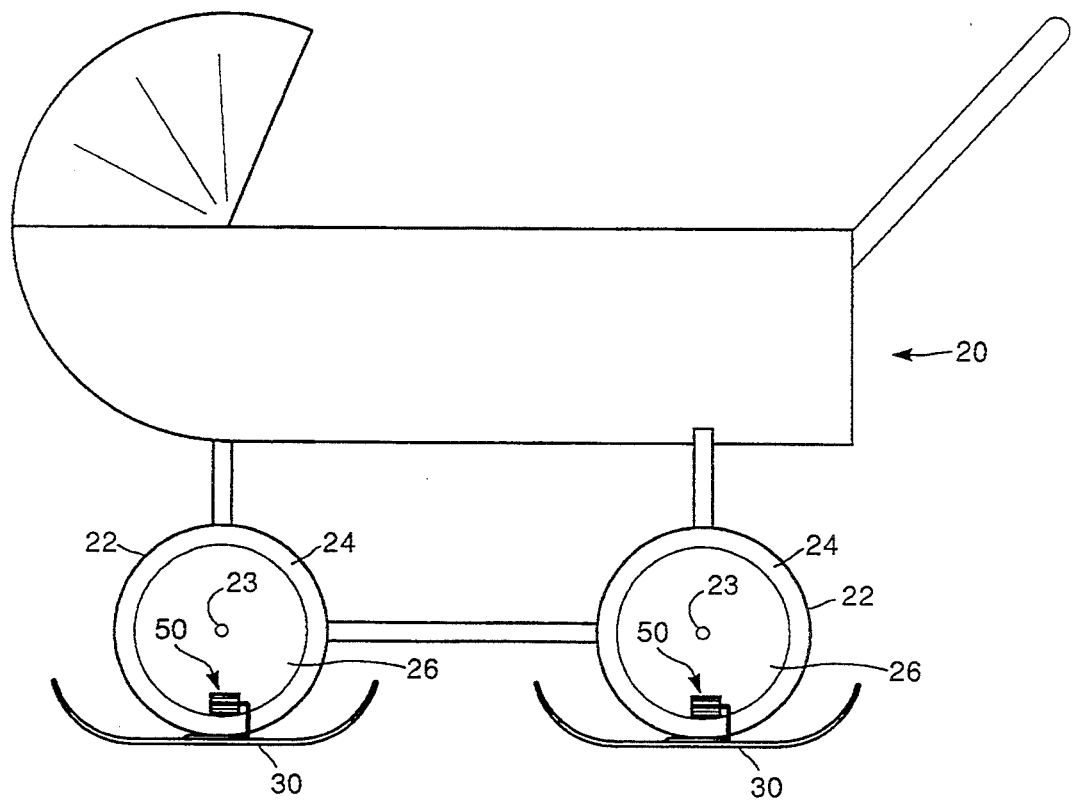
FIG. 1 is a side elevational view of a conventional baby carriage having the ski attachment of the present invention operatively mounted on each wheel.
Figure 2:
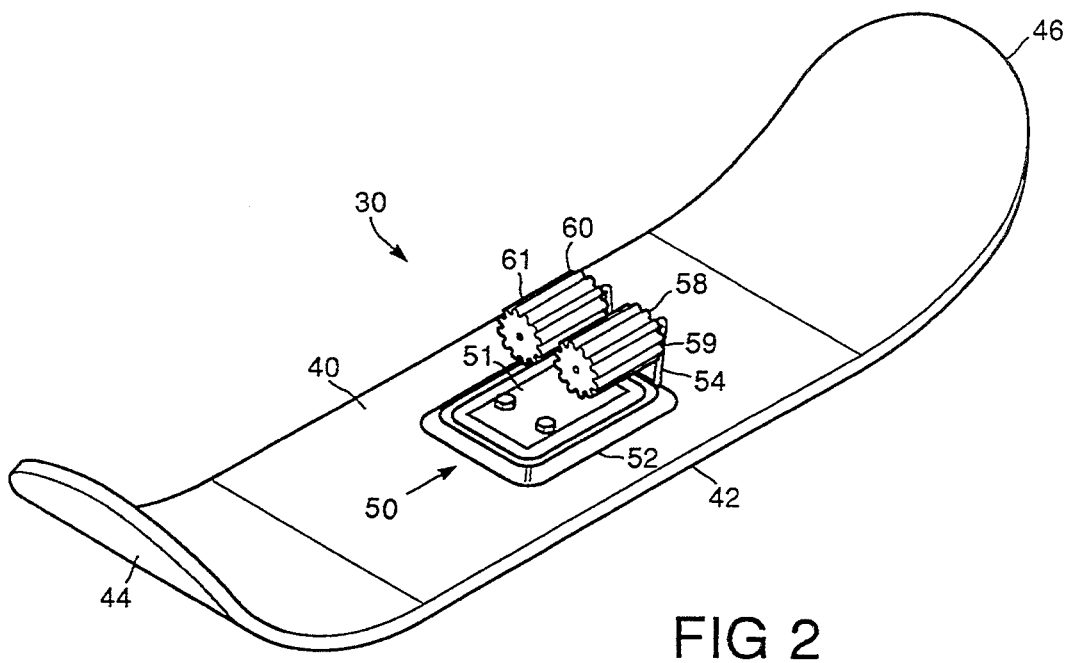
FIG. 2 is a perspective view of the ski attachment of the present invention, on an enlarged scale, viewed from the front left.

Reference will now be made to FIG. 1, which shows a conventional baby carriage 20, having wheels 22 notable mounted about a central axis 23. The wheels 22 each having an annular tire portion 24 and a thinner centrally disposed hub portion 26. The ski attachments 30 are operatively mounted on each of the wheels 22 by way of a singe attachment member 50, as will be discussed in greater detail subsequently, at the same location that each wheel rests on the ski attachment. The ski attachment 30 can be operatively mounted on virtually any diameter wheel, and mounted in this manner, can move in an angular sense with respect to the wheel in order to help absorb the impact of bumps. It should be noted that when the ski attachment 30 of the present invention is operatively mounted on a wheel 22, the wheel 22 does not rotate, except to pivot back and forth slightly as the ski attachment 30 tracks over non-flat terrain. Also, the ski attachments 30 are easy to mount on to and demount from the wheels, as will be discussed in greater detail subsequently.

Reference will now be made to FIGS. 2 through 5, which show the ski attachment 30 of the present invention in greater detail. This ski attachment 30 includes a ski member 40 having an elongated generally planar runner portion 42, an upturned front portion 44, and an upturned rear portion 46. The upturned front and rear portions 44 and 46 allow the ski attachment 30 to be moved forwardly or rearwardly over snow and ice. Further, the upturned front portion 44 and the upturned rear portion 46 may be substantially identical one to the other so that the ski attachment 30 is substantially symmetrical from front to rear.

The single attachment member 50 is used to operatively mount the ski attachment 30 onto the respective wheels 22 of the baby carriage 20. The single attachment member 50 has a base portion 52 securely attached to the runner portion 42 of the ski member 30. First and second co-operating arm members 54 and 56 extend upwardly from the base portion 52 and are attached thereto in movable relation with respect to each other. The first and second arm member 54 and 56 are made from a spring metal material and are thereby adapted to provide a gripping force between the first and second opposed gripping member 58 and 60, at their respective outer surfaces 59 and 61, with the gripping force being sufficient so as to cause the first and second opposed gripping members 58 and 60 to grip the hub portion 26 of the wheel 22 and thereby keep the ski attachment 30 operatively mounted on the wheel 22.

Preferably, the first and second gripping member 58 and 60 are substantially cylindrical in overall peripheral shape and are freely rotatably mounted on the first and second arm members 54 and 56. Such freely rotatable mounting of the gripping member 58 and 60 permits easier mounting and removal of the ski attachments 30 onto and off the respective wheels 22, since the first and second opposed gripping members 58 and 60 are fairly strongly biased to a generally closed position. The first and second gripping member 58 and 60 are spaced apart by only a small distance at most, so as to be able to securely grip both sides of the centrally disposed hub portion 26 of the wheel 22. The ski attachment 30 is mounted onto the wheel 22 by placing the ski attachment 30 on the ground, positioning the wheel 22 over the ski attachment 30 such that the annular tire portion 24 is over the first and second opposed gripping members 58 and 60 and in contact therewith. The wheel 22 is then moved downwardly such that the annular tire portion 24 caused the first and second opposed gripping members 58 and 60 to spread apart until the thinner centrally disposed hub portion 26 is reached, whereat the first and second opposed gripping members 58 and 60 are biased together to grip the centrally disposed hub portion 26. The ski attachment 30 is demounted by pulling it off the wheel 22 in the generally opposite direction as mounting. It has been found that standing on the ski attachment 30 and lifting the wheeled vehicle, such as the baby carriage 20, is an easy way of demounting the ski attachment 30.

The first and second arm members 54 and 56 of the single attachment member 50 are shaped and dimensioned so as to position the first and second opposed gripping members 58 and 60 to engage the centrally disposed hub portion 26 of the wheel 22, generally in the same location as the annular tire portion 24 of the wheel 22 contacts the ski attachment 30. More specifically, the first and second opposed gripping members 58 and 60 are substantially in radial alignment on the wheel 22 with the segment of the ski attachment 30 that receives the annular tire portion 24 of the wheel 22, so as to be interposed between the central axis 23 of the wheel 22 and the segment of the ski attachment 30 that receives the annular tire portion 24 of the wheel 22. Having the attachment member 50 grip the wheel 22 in the same location as the annular tire portion 24 of the wheel 22 contacts the ski attachment 30, allows the ski attachment 30 to be operatively mounted to any diameter wheel 22. Preferably, the wheel 22 has an annular tire portion 24 that is wider that the centrally disposed hub portion 26 in order to help retain the ski attachment 30 on the wheel 22. Operative mounting onto any diameter wheel cannot be accomplished by any of the devices as disclosed in the prior—art.

Further, this manner of operatively mounting the ski attachment 30 allows the ski member 40 to move in an angular sense—such that the front portion 44 and rear portion 46 move up and down—with respect to the wheel 22 under certain conditions, such as severe bumpiness of the snowy and icy terrain, in order to absorb the impact of bumps. This is possible because the first and second opposed gripping members 58 and 60 are located at substantially the same location as where the annular tire portion 24 of the wheel 22 contacts the ski attachment 30. Essentially, there is very little movement axis between the gripping members 58 and 60 and the contact point between the annular tire portion 24 and the ski attachment 30. Accordingly, the friction between the gripping members 58 and 60 and the centrally disposed hub portion 26 is generally insufficient to preclude angular pivotal motion of the ski attachment 30 with respect to the wheel 22. In contrast, the prior art devices all attach at more than one location on a wheel or attach to more than one wheel, thus precluding such relative pivotal movement in an angular sense between the device and the wheel it is mounted on. It should also be noted that each of the ski attachments 30 move with respect to the respective wheel 22 independently of the ski attachment 30 and the other wheels 22. Also, the Ski attachment 30 is easy to attach to and detach from the wheel 22. The ski attachment 30 can also move laterally, in an angular sense, such that the left or right side of the ski attachment may move up or down so as to accommodate any change in slope of the terrain laterally with respect to the vehicle. In order to accommodate the angular lateral movement, the first and second opposed gripping members 58 and 60 may move on the centrally disposed hub portion 26, probably by rolling, as they are freely rotatably mounted on the respective first and second arm member 54 and 56.

The respect outer surfaces 59 and 61 of each of the first and second gripping members 58 and 60 comprise a plurality of elongated rib members 62 disposed along the length thereof. These elongated rib members 62 are incorporated so as to allow the freely rotatably mounted first and second gripping members 58 and 60 to resist rolling along the centrally disposed hub portion 26 of the wheel 22, thereby keeping the ski attachment 30 more securely in place.

One further advantage of mounting the ski attachment 30 in the above described manner, is that the ski attachment 30 does not clamp directly to the annular tire portion 24 of the wheel 22, thereby precluding any chance of damage to the annular tire portion 24. It is also contemplated that the ski attachment 30 could be operatively mounted on other wheeled vehicles such as scooters and the like.

It is further contemplated that the ski attachment 30 could be operatively mounted on a suitable receiving member other than a wheel, as the ski attachment 30 does not need to be mounted on a specific size wheel.

Other modifications and alterations may be used in the design and manufacture of the ski attachment of the present invention without departing from the spirit and scope of the accompanying claims.

What is claimed is:

1. A ski attachment for operatively mounting onto one wheel of a wheeled vehicle, said wheel configured to rotate about a central axis and having an outer annular tire portion and thinner centrally disposed hub portion, said ski attachment comprising:

a ski member having a runner portion and an upturned front portion;

a single attachment member having a base portion securely attached to said runner portion of said ski member, first and second co-operating arm members mounted on said base portion, and first and second opposed gripping member each having an outer surface and being mounted on said first and second arm members respectively; and biasing means adapted to provide a gripping force between said first and second opposed gripping members, wherein said gripping force is sufficient so as to cause said first and second opposed gripping members to grip said wheel and thereby keep said ski attachment operatively mounted on said wheel;

wherein said first and second arm members of said single attachment member are shaped and dimensioned so as to position said first and second opposed gripping members substantially in radial alignment on said wheel with the a segment of said ski attachment that engages the outer annular tire portion of said wheel, so as to be interposed between said central axis of said wheel and said segment of said ski attachment that engages the outer annular tire portion of said wheel.

2. The ski attachment of claim 1, wherein said runner portion is generally planar in shape.

3. The ski attachment of claim 2, wherein said runner portion is generally elongated.

4. The ski attachment of claim 3, further comprising an upturned rear portion.

5. The ski attachment of claim 4, wherein said first and second arm members are shaped and dimensioned such that said first and second gripping members engage the hub portion of said wheel.

6. The ski attachment of claim 5, wherein said first and second gripping members are substantially cylindrical in overall peripheral shape.

7. The ski attachment of claim 6, wherein said first and second gripping members are freely rotatably mounted on said first and second arm members.

8. The ski attachment of claim 7, wherein the outer surface of each of said first and second gripping members comprises a plurality of elongated rib members disposed along the length of said outer surface.

* * * * *